(12) United States Patent
Kusunoki

(10) Patent No.: US 12,117,050 B2
(45) Date of Patent: Oct. 15, 2024

(54) CAM CLUTCH

(71) Applicant: TSUBAKIMOTO CHAIN CO., Osaka (JP)

(72) Inventor: Sota Kusunoki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/132,814

(22) Filed: Apr. 10, 2023

(65) Prior Publication Data

US 2023/0332652 A1  Oct. 19, 2023

(30) Foreign Application Priority Data

Apr. 13, 2022 (JP) .................................. 2022-066109

(51) Int. Cl.
 *F16D 41/07* (2006.01)
 *F16D 41/06* (2006.01)

(52) U.S. Cl.
 CPC ...... *F16D 41/07* (2013.01); *F16D 2041/0601* (2013.01)

(58) Field of Classification Search
 CPC .. F16D 41/07; F16D 41/08; F16D 2041/0605; F16D 41/084; F16D 41/088
 See application file for complete search history.

(56) References Cited

U.S. PATENT DOCUMENTS

| | | | | |
|---|---|---|---|---|
| 4,089,395 A | * | 5/1978 | Fogelberg | F16D 41/084 192/41 A |
| 4,327,822 A | * | 5/1982 | Vogele | F16D 41/07 192/41 A |
| 4,635,770 A | * | 1/1987 | Shoji | F16D 41/07 192/41 A |
| 4,979,600 A | * | 12/1990 | Zanoni | F16D 41/07 192/41 A |

(Continued)

FOREIGN PATENT DOCUMENTS

| | | |
|---|---|---|
| EP | 1639267 A1 | 3/2006 |
| JP | 2011-231828 A | 11/2011 |

(Continued)

OTHER PUBLICATIONS

Extended (Supplementary)European Search Report dated Aug. 22, 2023, issued in counterpart EP Application No. 23164980.7. (7 pages).

*Primary Examiner* — Stacey A Fluhart
(74) *Attorney, Agent, or Firm* — WHDA, LLP

(57) ABSTRACT

To provide a cam clutch capable of preventing unwanted jamming of cams and switchable between operation modes with little force, thereby allowing size reduction. The cam clutch includes an inner race, an outer race, a plurality of cams, and a biasing means biasing the plurality of cams. The plurality of cams include first cams and second cams that have different engaging directions. The cam clutch further includes a frictional resistance generating means for generating friction resistance between a component adapted to tilt (Continued)

the first cams or second cams in the engaging direction, and the inner race and/or outer race when the first cams and second cams are simultaneously lifted off and separated from the raceways of the inner race and/or outer race during switching of operation modes.

9 Claims, 11 Drawing Sheets

(56) References Cited

U.S. PATENT DOCUMENTS

| | | | | |
|---|---|---|---|---|
| 5,016,741 A | * | 5/1991 | Leitz | F16D 41/07 |
| | | | | 192/41 A |
| 5,024,308 A | * | 6/1991 | Kinoshita | F16D 41/067 |
| | | | | 192/41 A |
| 5,038,903 A | * | 8/1991 | Akagi | F16D 41/07 |
| | | | | 192/41 A |
| 5,335,761 A | * | 8/1994 | Leitz | F16D 41/07 |
| | | | | 192/41 A |
| 5,445,255 A | * | 8/1995 | Rutke | F16D 41/084 |
| | | | | 192/41 A |
| 5,601,167 A | * | 2/1997 | Kinoshita | F16D 41/07 |
| | | | | 188/82.8 |
| 5,632,363 A | * | 5/1997 | Kubo | F16H 41/24 |
| | | | | 188/82.8 |
| 2005/0274585 A1 | * | 12/2005 | Straub | F16D 41/07 |
| | | | | 192/41 A |
| 2006/0090978 A1 | * | 5/2006 | Straub | F16D 41/07 |
| | | | | 192/41 A |
| 2014/0202821 A1 | | 7/2014 | Schotten | |

FOREIGN PATENT DOCUMENTS

| | | | | |
|---|---|---|---|---|
| WO | WO-9314328 A1 | * | 7/1993 | F16D 41/07 |
| WO | 2005010393 A1 | | 2/2005 | |
| WO | 2009008093 A1 | | 1/2009 | |

* cited by examiner

CAM CLUTCH

BACKGROUND OF THE INVENTION

1. Field of the Invention

The present invention relates to a cam clutch configured to be capable of switching from one operation mode to another.

2. Description of the Related Art

As one type of clutch that controls torque transmission and interruption, two-way clutches that can switch between drive and freewheel modes in both forward and reverse directions are known.

Japanese Patent Application Publication No. 2011-231828, for example, describes a clutch configured to be capable of switching from one to another among three operation modes, i.e., a two-way free mode allowing rotation in both forward and reverse directions; a one-way lock mode allowing rotation only in the forward direction and prohibiting rotation in the reverse direction; and a one-way lock mode allowing rotation only in the reverse direction and prohibiting rotation in the forward direction, by control of a retainer that retains both first sprags and second sprags that are biased by a biasing means toward opposite rotation locking directions.

SUMMARY OF THE INVENTION

The above-described two-way clutch forces all of the first sprags and second sprags to tilt by control of the retainer when switching operation modes, which means that the clutch cannot operate in a two-way lock mode that prohibits relative rotation between the outer race and the inner race in both forward and reverse directions.

In the two-way clutch described above, the first sprags and second sprags are biased to stay in contact with the outer race and inner race so that one group of sprags tilt and immediately start wedging against the outer race and inner race upon torque application to the outer race or inner race, while the other group of sprags remain in sliding contact with the outer race and inner race and are kept in the standby state.

When the torque is removed, the wedging group of sprags tilt in the disengaging direction to switch to a freewheeling state. At this time, there is a possibility that the other group of sprags tilt in the engaging direction and start wedging against the outer race and inner race before the wedging group of cams are disengaged, whereupon unwanted jamming can occur in which all the cams are jammed at the same time.

When this happens, all the sprags are engaged with a high surface contact, so that a large force is required to change the orientation of the sprags to switch the operation mode of the cam clutch from the lock mode that prohibits relative rotation of the outer race and inner race in one or both of forward and reverse directions to the free mode that allows relative rotation of the outer race and inner race in both directions. This may be detrimental to the engaging surfaces of the sprags in contact with the outer race and inner race or the raceways of the outer race and inner race, and may shorten the service life of the cam clutch. In addition, the components provided for changing the orientation of the sprags need to have high rigidity.

One type of selectable cam clutch has sets of cam clutches arranged reversely to make their engaging directions opposite from each other to realize a two-way lock mode that prohibits relative rotation between the outer race and the inner race in both forward and reverse directions. This cam clutch is designed to intentionally cause both cams to engage slightly with the outer and inner races in a no-load of torque condition to enable switching of the rotation direction from forward to reverse or vice versa. This is because when both sets of cams are disengaged at the same time under no load of torque and kept lifted off from the raceway of the inner race or outer race, the torque successively applied may fail to be transmitted and the inner race or outer race may run idle. When this happens, the engaging direction of cams can no longer be reversed as intended. One or the other set of cams are therefore intentionally made to engage slightly when reversing the direction, to avoid unwanted freewheeling.

Switching of operation modes in the state where the cams are intentionally engaged even slightly, requires a certain level of force because of the engaging torque acting as a resistance force. This engaging torque tends to depend largely on the tolerance of the component adapted to change the orientation of cams, and a significant level of force may be required for switching the operation modes depending on the tolerance. It follows, then, that cam clutches with such a configuration could also require a large force to change the orientation of wedged cams when switching the operation modes. There are thus still the issues of shortened life of clutch due to damage on the outer circumferential surface of cams or the raceways of inner race and outer race, and of high rigidity requirement for the component for changing the orientation of the cams.

The present invention has been made in view of the circumstances described above and it is an object of the invention to provide a cam clutch that prevents unwanted jamming of cams with a simple structure and thereby prolongs service life, and that is switchable between operation modes with little force and thereby allows size reduction.

The present invention achieves the above object by providing a cam clutch including: an inner race and an outer race that are coaxial and rotatable relative to each other; a plurality of cams that are circumferentially arranged between the inner race and the outer race; and a biasing means for biasing each of the plurality of cams to make contact with the inner race and the outer race.

The plurality of cams include first cams and second cams that wedge against the inner race and the outer race in different directions from each other.

The cam clutch further includes an operation mode switching mechanism that switches operation modes of the cam clutch.

The operation modes selectable by the operation mode switching mechanism include a two-way lock mode that prohibits relative rotation of the inner race and the outer race in both of a forward direction and a reverse direction.

The cam clutch includes a frictional resistance generating means for generating friction resistance between a component adapted to tilt the first cams or the second cams in an engaging direction, and the inner race and/or the outer race from which the first cams and the second cams are being separated, when the first cams and the second cams are simultaneously lifted off and each slightly separated from a raceway of the inner race and/or a raceway of the outer race in the two-way lock mode.

According to the present invention, when the engaging direction is reversed in the two-way lock mode of the cam clutch, the first cams and the second cams are essentially lifted off at the same time in a no-load condition, each slightly separated from the raceway of the inner race and/or the raceway of the outer race, and therefore simultaneous wedging of the first cams and second cams against the inner race and outer race is avoided. Moreover, the frictional resistance generating means that generates friction resistance between the component adapted to tilt the first cams and second cams, and the inner race and/or the outer race, from which the first cams and second cams are being separated, enables torque transmission from the inner race or outer race, even when both cams are lifted off, to either the first cams or the second cams whichever should engage next to cause the cams to tilt in the engaging direction and to make contact with the raceway of the inner race and/or outer race. Accordingly, unwanted freewheeling where the torque acting on the inner race or outer race fails to be transmitted to either of the first cams or the second cams is prevented and the two-way lock mode is implemented. Since the first cams and second cams are completely disengaged when the engaging direction is reversed, the thrust required for switching to another operation mode can be significantly reduced, which contributes to size reduction of the switching mechanism. Moreover, damage on the raceways of the inner and outer races can be minimized or eliminated even with more frequent switching of operation modes, so that the cam clutch can have a longer service life.

According to the configuration that includes an outer cage ring, an inner cage ring, and a position-restricting cage ring that restricts the degree of freedom of circumferential movement of these outer and inner cage rings, the outer cage ring may be assigned the function of controlling the orientation of the first cams, the inner cage ring may be assigned the function of controlling the orientation of the second cams, and the degree of freedom of circumferential movement of the outer cage ring and inner cage ring may be restricted by the position-restricting cage ring. This way, the cams can be tilted to change the orientation and maintained in that orientation only by moving one or both of the outer cage ring and inner cage ring in the axial direction. This enables configuration of a high-functionality cam clutch switchable to four operation modes with a simple structure.

By restricting the degree of freedom of circumferential movement of the outer cage ring and inner cage ring, simultaneous wedging of both of the first cams and second cams against the outer race and inner race in the transition of cam orientation is avoided. Thus smooth operation can be realized and high responsiveness can be achieved.

Moreover, the outer cage ring and/or inner cage ring can serve as the component adapted to tilt the first cams or second cams in the engaging direction. Namely, friction resistance can be generated between the outer cage ring and/or inner cage ring, and the inner race and/or the outer race, from which the first cams and second cams are being separated. This means that the first cams or second cams can be tilted in the engaging direction to make contact with the raceway of the inner race and/or outer race by rotating the outer cage ring and/or inner cage ring together with the outer race and/or inner race or by moving the cage ring(s) circumferentially relative to the outer race and/or inner race. Thus torque acting on the inner race or outer race, when both of the first and second cams are lifted off, can be reliably transmitted to either the first cams or the second cams whichever should engage next.

According to the configuration in which the outer cage ring and inner cage ring respectively have first cam holding parts and second cam holding parts of different opening shapes, the first cams and second cams can both be readily lifted off by suitably setting the circumferential positions of corresponding cam holding parts of the inner cage ring and outer cage ring, so that accidental simultaneous wedging of the first cams and second cams against the inner race and outer race can be reliably prevented. It is also possible to tilt only one of the first cams or the second cams by suitably changing the opening shape of the respective first cam holding parts and second cam holding parts of the outer cage ring and inner cage ring that constitute the operation mode switching mechanism. Namely, the outer cage ring and inner cage ring are each integrally formed with a mechanism for changing the orientation of the cams, which simplifies the structure and leads to size reduction, as well as enables a reduction in the number of components and an increase in the holding torque. The first cam holding parts of the outer cage ring and the second cam holding parts of the inner cage ring are openings of an irregular shape rather than a simple rectangle, which include an opening-width transition part where the opening width changes in a continuous manner. This allows the cams that could slightly jam due to production errors or the like to be disengaged with a small thrust. Moreover, additional operation modes and switching between these operation modes can be realized by suitably changing the opening shapes of the first cam holding parts and second cam holding parts of the outer cage ring and inner cage ring.

With the configuration in which the frictional resistance generating means includes a plate spring member that is fixedly provided on an inner circumferential surface of the inner cage ring and/or an outer circumferential surface of the outer cage ring, the plate spring member allows the outer cage ring or inner cage ring to rotate with the outer race or inner race by friction resistance, even when the first cams and second cams are both lifted off. With this circumferential movement, the cams that need to engage next can be tilted in the engaging direction. Thus the simple structure, with only a fixedly provided plate spring member, enables reversal of the engaging direction of cams.

With the configuration in which the plate spring member having a U-shaped cross section is positioned at one specified end on the inner circumferential surface of the inner cage ring and/or the outer circumferential surface of the outer cage ring with a top portion being oriented toward the other end, the plate spring member provides the effect of friction resistance and causes the cage ring to rotate with the outer race or inner race in the two-way lock mode. On the other hand, in the two-way free mode that allows rotation in both forward and reverse directions, the plate spring member does not touch the outer race or inner race and does not generate friction resistance. Thus wear and drag torque can be minimized. The plate spring member starts contacting the inner race or outer race as the inner cage ring or the outer cage ring is axially moved in the switching of operation modes. Since the top portion of the plate spring member is oriented toward the other end, the plate spring member moving with the top portion first can smoothly slide in between the cage ring and the inner race or outer race without damage. The above effect is therefore reliably achieved.

With the configuration in which the frictional resistance generating means includes an O-ring that is fixedly provided on the raceway of the inner race and/or the raceway of the outer race, similarly to the case with the plate spring member, the outer cage ring or inner cage ring can be rotated with the outer race or inner race by friction resistance generated by the O-ring even when the first cams and second cams are both lifted off. With this circumferential movement, the cams that need to engage next can be tilted in the engaging direction. Thus the simple structure, with only a fixedly provided O-ring, enables reversal of the engaging direction of cams.

With the configuration in which the O-ring is positioned at one specified end on the raceway of the inner race and/or raceway of the outer race, the O-ring provides the effect of friction resistance and causes the cage ring to rotate with the outer race or inner race in the two-way lock mode. On the other hand, in the two-way free mode that allows rotation in both forward and reverse directions, the O-ring does not touch the outer race or inner race and does not generate friction resistance. Thus wear and drag torque can be minimized.

DESCRIPTION OF THE PREFERRED EMBODIMENTS

Figure 1:
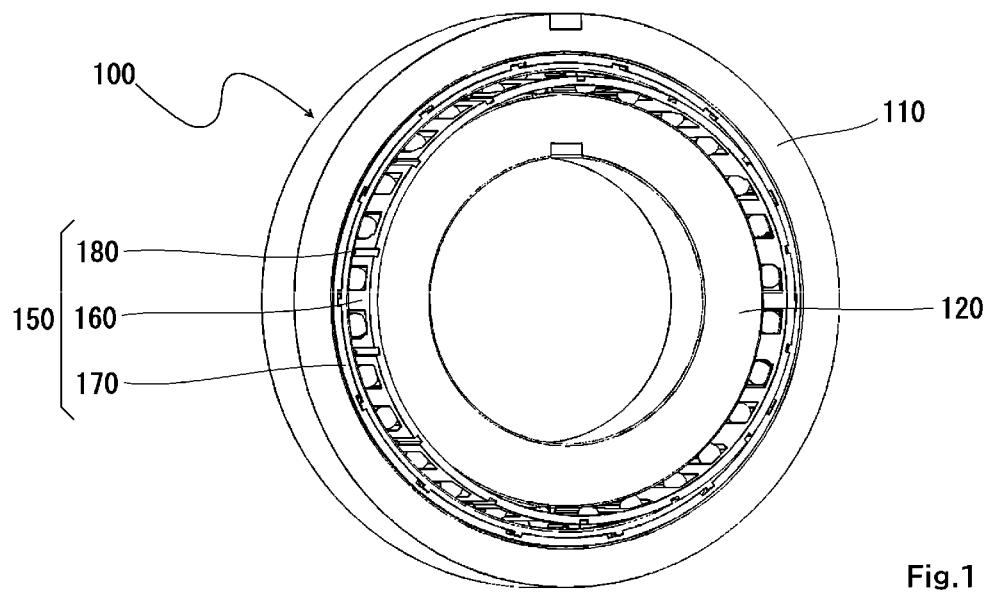
FIG. 1 is a perspective view of a cam clutch according to a first embodiment of the present invention viewed from the front in the axial direction.
Figure 2:
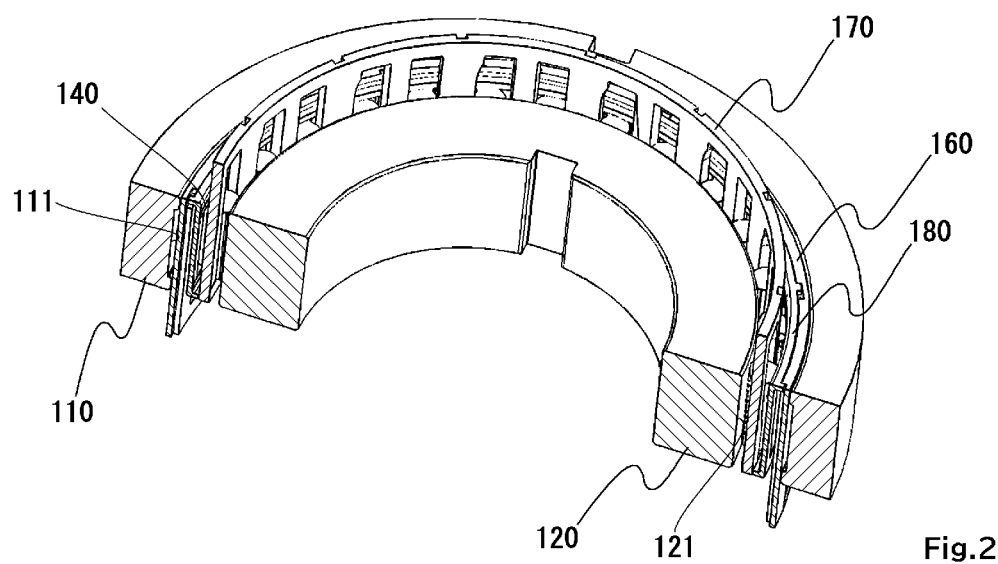
FIG. 2 is a perspective view of the cam clutch shown in FIG. 1 with a cross section along a plane containing the rotation axis of the cam clutch.
Figure 3:
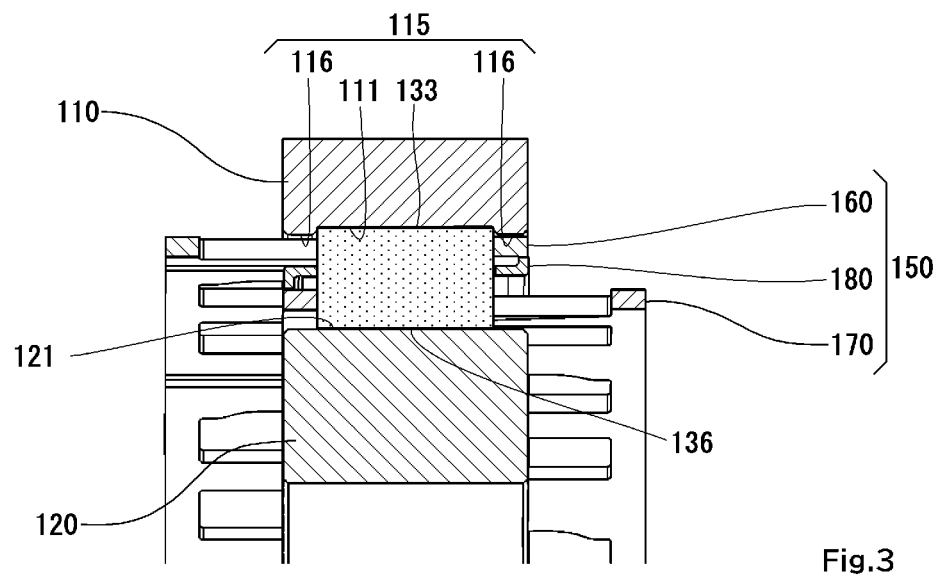
FIG. 3 is an axial cross-sectional view illustrating part of a cross section of the cam clutch shown in FIG. 1 along a plane containing the rotation axis of the cam clutch.

Embodiments of the present invention are described with reference to FIG. 1 to FIG. 17.

Embodiment 1

As shown in FIG. 1 to FIG. 4, the cam clutch 100 according to the first embodiment of the present invention includes: an outer race 110 and an inner race 120 coaxial and rotatable relative to each other; a plurality of circumferentially spaced cams in an annular space between raceways 111 and 121 of the outer race 110 and inner race 120 serving as sprags to transmit and interrupt torque between the outer race 110 and inner race 120; a biasing means 140 biasing each of the plurality of cams toward an engaging direction to make contact with the outer race 110 and inner race 120; an outer cage ring 160 and an inner cage ring 170 coaxially and rotatably provided to the outer race 110 and inner race 120, respectively, and retaining each of the plurality of cams between the outer race 110 and the inner race 120; and a position-restricting cage ring 180 provided between the outer cage ring 160 and the inner cage ring 170 to restrict the degree of freedom of circumferential movement of the outer cage ring 160 and inner cage ring 170. Reference symbol C in FIG. 4 denotes the rotation axis.

The outer race 110 has a position restricting part 115 that restricts axial movement of each of the plurality of cams. In this embodiment, the position restricting part 115 is formed by inward ribs 116, each of which is provided at each of both axial ends on the inner circumferential surface of the outer race 110 to protrude radially inward all around. The plurality of cams are each positioned between the inward ribs 116 so that axial movement of each cam is restricted.

The plurality of cams include first cams 130a and second cams 130b that wedge against the outer race 110 and inner race 120 in different directions.

In this embodiment, the first cams 130a and second cams 130b have outer shapes that are identical to each other, for example, the first cams 130a reversed front to back being used as the second cams 130b.

The first cams 130a and second cams 130b are alternately and circumferentially equally spaced, for example.

The arrangement of the first cams 130a and second cams 130b is not limited to this particular layout. The first cams 130a and second cams 130b may not necessarily alternate in the circumferential direction, and the numbers of the first cams 130a and second cams 130b may differ.

Figure 4:
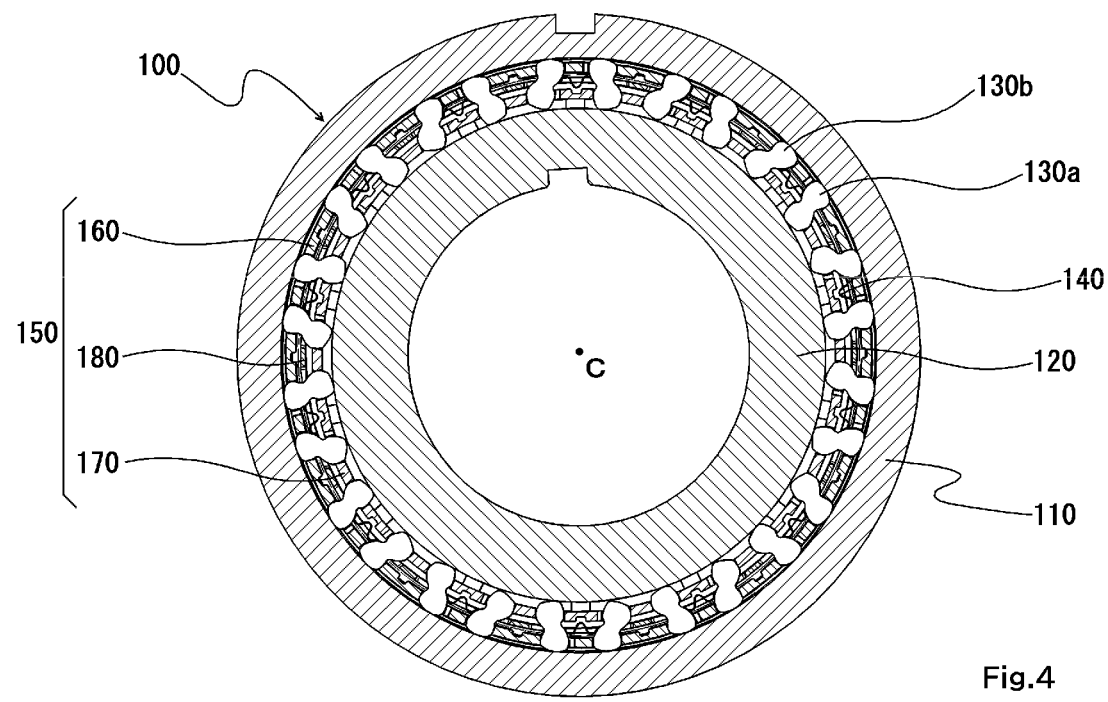
FIG. 4 is a radial cross section of the cam clutch shown in FIG. 1 along a plane perpendicular to the rotation axis of the cam clutch, viewed from the front in the axial direction.

The engaging direction of the first cam 130a is clockwise in FIG. 4 (hereinafter referred to as "forward direction"). The first cam 130a is configured to wedge against the outer race 110 and inner race 120 when the outer race 110 is rotated in the forward direction, or when the inner race 120 is rotated counterclockwise in FIG. 4 (hereinafter referred to as "reverse direction").

The engaging direction of the second cam 130b is counterclockwise. The second cam 130b is configured to wedge against the outer race 110 and inner race 120 when the outer race 110 is rotated in the reverse direction, or when the inner race 120 is rotated in the forward direction.

Figure 5:
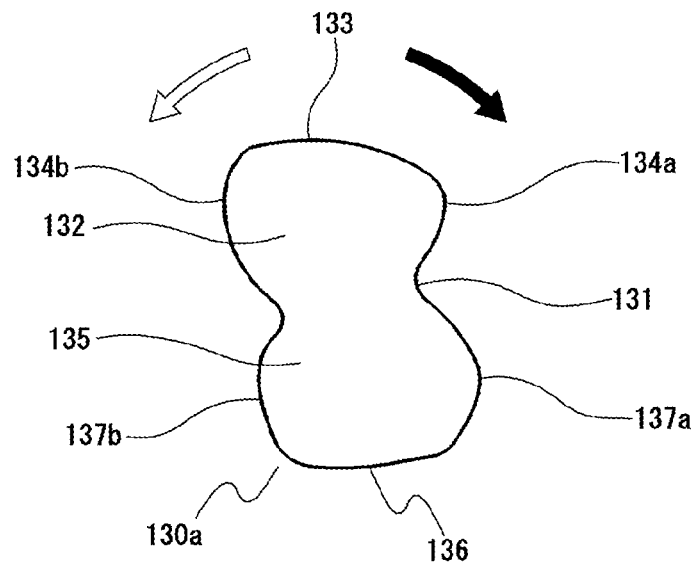
FIG. 5 is a plan view illustrating the configuration of the cam.

The first cam 130a and second cam 130b have an outer contour with curved parts along an involute as viewed in the axial direction or in plan view. One configuration example of the first cam 130a is shown in FIG. 5. In FIG. 5, the solid arrow indicates the engaging direction of the first cam 130a and the open arrow indicates the disengaging direction of the first cam 130a. As mentioned above, the second cam 130b is the first cam 130a reversed front to back, i.e., the second cam 130b has the same shape as the first cam 130a, and therefore description thereof will be omitted.

The first cam 130a has a substantially figure-eight shape, with a constricted part 131 in the middle in the radial direction.

A head part 132 on the radially outer side of the constricted part 131 of the first cam 130a has an outer-race engaging surface 133. Both side faces 134a and 134b smoothly continuous with the outer-race engaging surface 133 and in contact with the outer cage ring 160 are curved surfaces formed such that the head part 132 has a constant width irrespective of the orientation of the first cam 130a. Specifically, the side faces 134a and 134b of the head part 132 are formed along curves of involutes of the same basic circle as viewed in the axial direction or in plan view.

A leg part 135 on the radially inner side of the constricted part 131 of the first cam 130a has an inner-race engaging surface 136. Both side faces 137a and 137b smoothly continuous with the inner-race engaging surface 136 and in contact with the inner cage ring 170 are curved surfaces formed such that the leg part 135 has a constant width irrespective of the orientation of the first cam 130a. Specifically, the side faces 137a and 137b of the leg part 135 are formed along curves of involutes of the same basic circle as viewed in the axial direction or in plan view.

This outer contour of the first cam 130a and the second cam 130b enables a small-size cam to have a large rotation angle while keeping the ability to engage with the outer cage ring 160 and inner cage ring 170 in a highly coordinated manner. Therefore the cams can be reduced in size, which enables configuration of a more compact cam clutch 100. Moreover, the engaging torque can be reduced in a controlled manner because the cams can be tilted with a smaller torque.

The biasing means 140 is a ribbon spring, for example. The biasing means 140 may be any resilient member that can bias each of the first cams 130a and second cams 130b in the engaging direction. For example, a plurality of plate springs or torsion springs may also be used.

Figure 6:
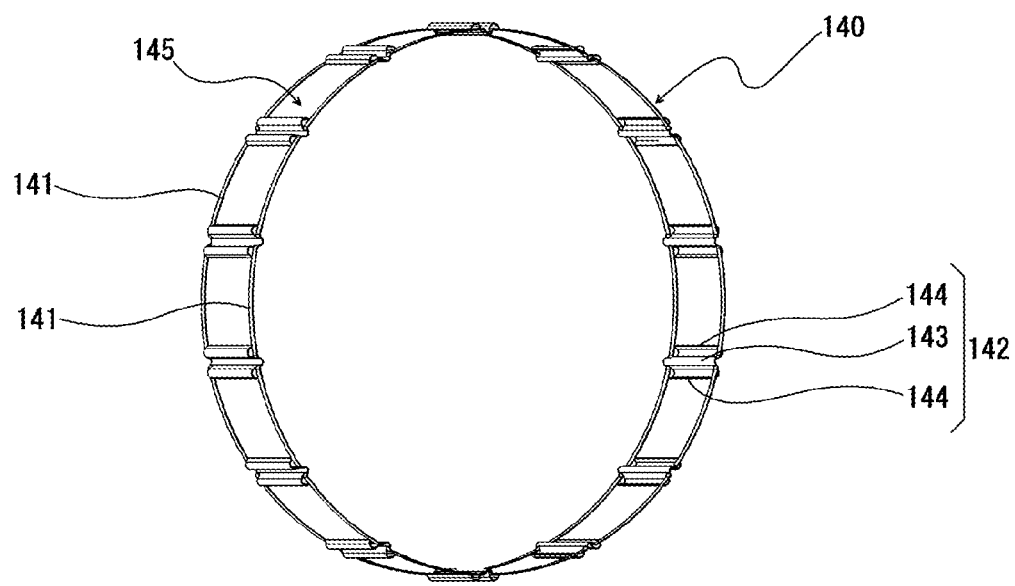
FIG. 6 is a perspective view illustrating the configuration of a biasing means in the cam clutch shown in FIG. 1, viewed from the rear in the axial direction.
Figure 7A:
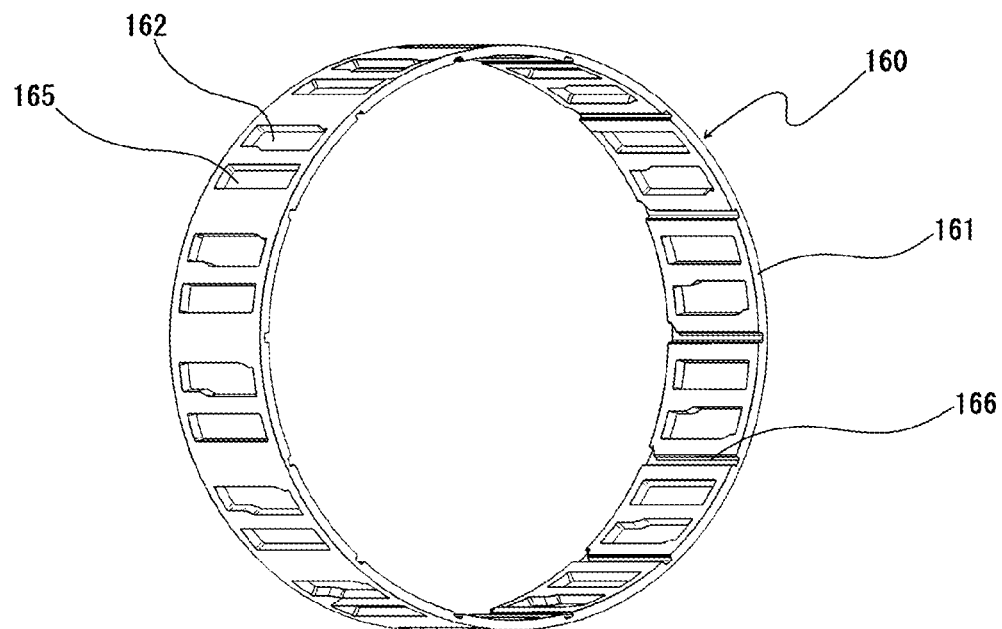
FIG. 7A is a perspective view illustrating the configuration of an outer cage ring viewed from the rear in the axial direction.
Figure 7B:
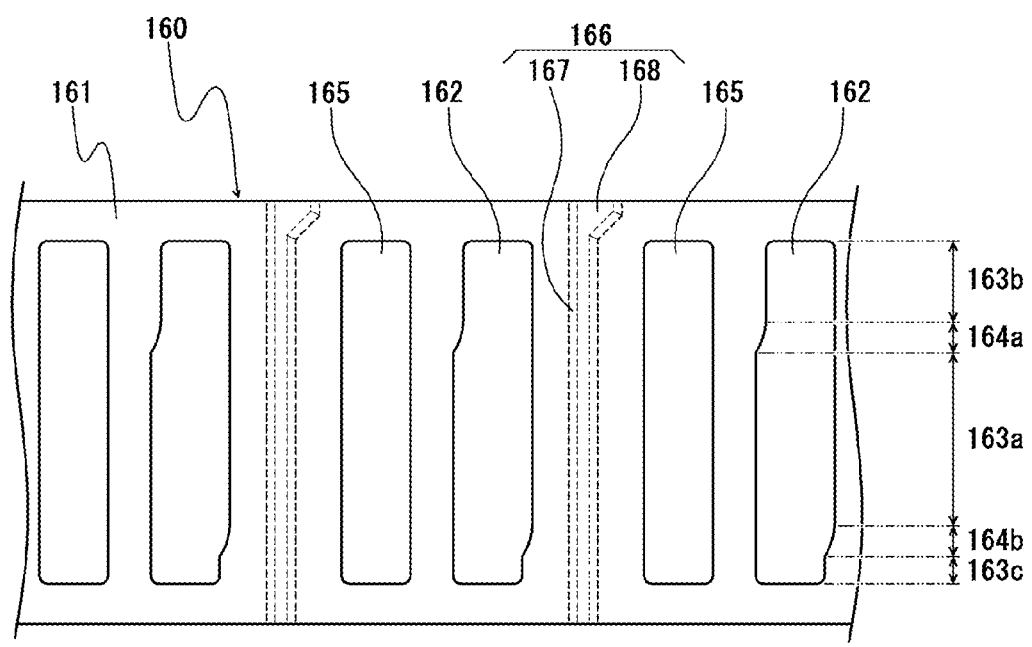
FIG. 7B is a developed view of part of the outer cage ring shown in FIG. 7A.

The ribbon spring as the biasing means 140 is made up for example of a pair of circumferentially extending annular parts 141 parallel to each other, and a plurality of connecting parts 142 connecting the annular parts 141 in the axial direction at a predetermined distance as shown in FIG. 6. The space between adjacent connecting parts 142 each forms a pocket part 145 that can accommodate one each of the first cam 130a and second cam 130b. The pocket parts 145 are circumferentially equally spaced apart.

The connecting parts 142 each include an arcuate bent portion 143 protruded radially inward, and pressing arm portions 144 protruded radially outward and continuously from both edges of the arcuate bent portion 143. These pressing arm portions 144 bias the first cams 130a and second cams 130b in respective engaging directions to wedge against the outer race 110 and inner race 120.

The cam clutch 100 according to this embodiment can switch from one to another of four operating modes: a forward lock mode prohibiting relative rotation between the outer race 110 and the inner race 120 in the forward direction; a reverse lock mode prohibiting relative rotation between the outer race 110 and the inner race 120 in the reverse direction; a two-way lock mode prohibiting relative rotation of the outer race 110 and the inner race 120 in both forward and reverse directions; and a two-way free mode allowing relative rotation of the outer race 110 and the inner race 120 in both forward and reverse directions, by means of an operation mode switching mechanism 150.

In this embodiment, the operation mode switching mechanism 150 is made up of the outer cage ring 160, inner cage ring 170, and position-restricting cage ring 180.

First cam holding parts 162 of the outer cage ring 160 are configured to include an opening-width transition part where the opening width changes continuously in the axial direction.

Specifically, the first cam holding part 162 includes a guide space 163a with a constant opening width in the axial direction, a first orientation-keeping space 163b having a smaller opening width than that of the guide space 163a and extending on the axial front side (upper side in FIG. 7B) of the guide space 163a, and a second orientation-keeping space 163c having a smaller opening width than that of the guide space 163a and extending on the axial rear side (lower side in FIG. 7B) of the guide space 163a. The first orientation-keeping space 163b continues from the guide space 163a via a first opening-width transition part 164a where the opening width is reduced continuously toward the front in the axial direction. The second orientation-keeping space 163c continues from the guide space 163a via a second opening-width transition part 164b where the opening width is reduced continuously toward the rear in the axial direction. The first opening-width transition part 164a is formed by an inwardly protruded opening edge that makes contact with the first cam 130a tilted in the disengaging direction (left side in FIG. 7B), and the second opening-width transition part 164b is formed by an inwardly protruded opening edge that makes contact with the first cam 130a tilted in the engaging direction (right side in FIG. 7B).

The second cam holding parts 165 of the outer cage ring 160 are rectangular, with a constant opening width in the axial direction.

The outer cage ring 160 is axially movable independently of the rotation of the outer race 110 and inner race 120 and thus can tilt the first cams 130a to change the orientation of the first cams 130a while keeping the second cams 130b in the same orientation.

As described above, the first cam holding parts 162 of the outer cage ring 160 are not simple rectangular openings but are irregular-shape open windows that reduce in opening width at both axial ends. Thus the cams that can slightly jam due to production errors or the like can be disengaged with a small thrust. Moreover, additional operation modes and switching between these operation modes can be realized by suitably changing the opening shape of the first cam holding parts 162.

The outer cage ring 160 is formed with axially extending inner surface grooves 166 on an inner face of the body part 161, each between the first cam holding part 162 and the second cam holding part 165 adjacent the first cam holding part 162 on the side toward which the first cam 130a is tilted in the engaging direction.

The inner surface grooves 166 each include a guide groove 167 extending straight from the rear edge to the front edge in the axial direction of the body part 161, and a slide groove 168 continuous from the axial front end of the guide groove 167. The slide groove 168 extends circumferentially toward the engaging direction of the first cam 130a, and is formed such as to allow circumferential movement of an outward protrusion 185 of the position-restricting cage ring 180 to be described later when the outer cage ring 160 is set to keep the first cams 130a in the engaged position.

Figure 8A:
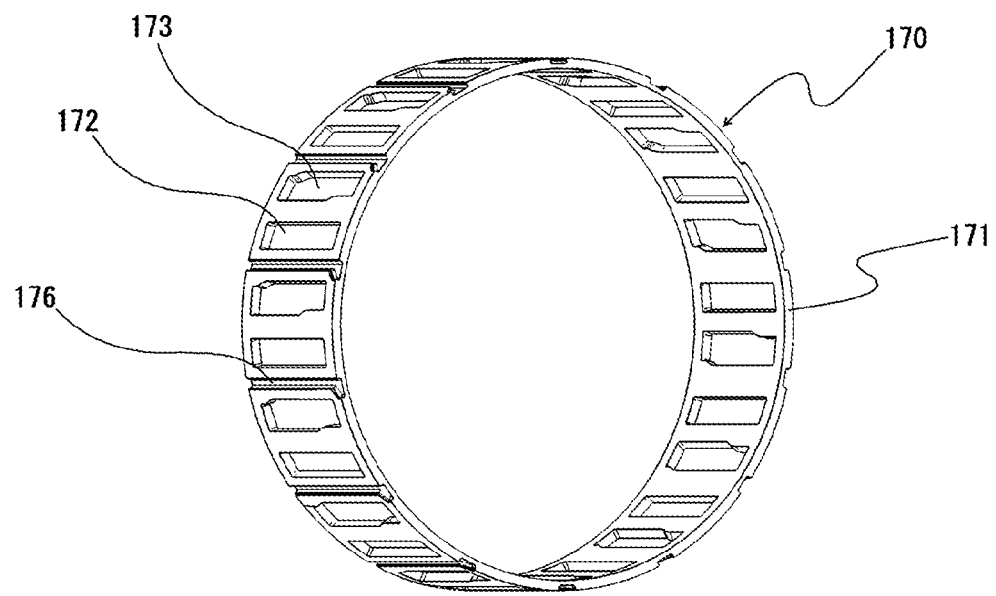
FIG. 8A is a perspective view illustrating the configuration of an inner cage ring viewed from the rear in the axial direction.
Figure 8B:
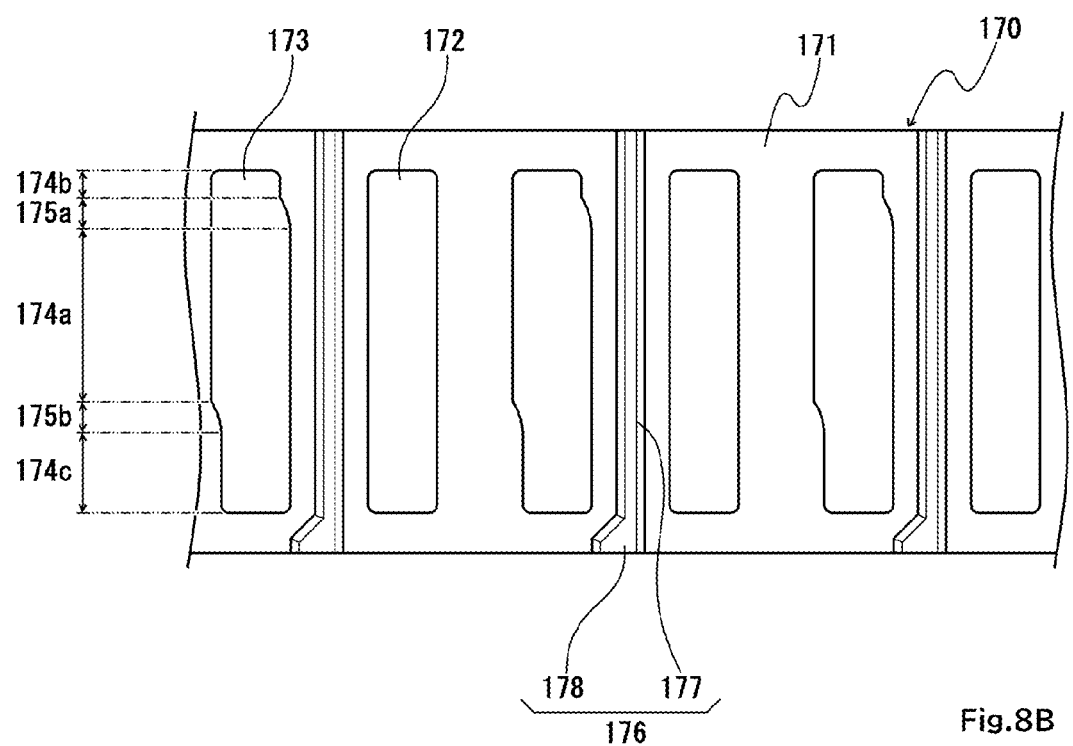
FIG. 8B is a developed view of part of the inner cage ring shown in FIG. 8A.

The inner cage ring 170 includes an axially extending cylindrical body part 171, as shown in FIG. 8A and FIG. 8B. The body part 171 has first cam holding parts 172 that accommodate the leg parts 135 of the first cams 130a and hold the first cams 130a, and second cam holding parts 173 that accommodate the leg parts of the second cams 130b and hold the second cams 130b, alternating in the circumferential direction.

The first cam holding parts 172 of the inner cage ring 170 are rectangular, with a constant opening width in the axial direction.

The second cam holding parts 173 of the inner cage ring 170 are configured to include an opening-width transition part where the opening width changes continuously in the axial direction.

Specifically, the second cam holding part 173 includes a guide space 174a with a constant opening width in the axial direction, a first orientation-keeping space 174b having a smaller opening width than that of the guide space 174a and extending on the axial front side (upper side in FIG. 8B) of the guide space 174a, and a second orientation-keeping space 174c having a smaller opening width than that of the guide space 174a and extending on the axial rear side (lower side in FIG. 8B) of the guide space 174a. The first orientation-keeping space 174b continues from the guide space 174a via a first opening-width transition part 175a where the opening width is reduced continuously toward the front in the axial direction. The second orientation-keeping space 174c continues from the guide space 174a via a second opening-width transition part 175b where the opening width is reduced continuously toward the rear in the axial direction. The first opening-width transition part 175a is formed by an inwardly protruded opening edge that makes contact with the second cam 130b tilted in the disengaging direction (right side in FIG. 8B), and the second opening-width transition part 175b is formed by an inwardly protruded opening edge that makes contact with the second cam 130b tilted in the engaging direction (left side in FIG. 8B).

The inner cage ring 170 is axially movable independently of the rotation of the outer race 110 and inner race 120 and thus can tilt the second cams 130b to change the orientation of the second cams 130b while keeping the first cams 130a in the same orientation.

As described above, the second cam holding parts 173 of the inner cage ring 170 are not simple rectangular openings but are irregular-shape open windows that reduce in opening width at both axial ends. Thus the cams that can slightly jam due to production errors or the like can be disengaged with a small thrust. Moreover, additional operation modes and switching between these operation modes can be realized by suitably changing the opening shape of the second cam holding parts 173.

The inner cage ring 170 is formed with axially extending outer surface grooves 176 on an outer face of the body part 171, each between the second cam holding part 173 and the first cam holding part 172 adjacent the second cam holding part 173 on the side toward which the second cam 130b is tilted in the disengaging direction.

The outer surface grooves 176 each include a guide groove 177 extending straight from the front edge to the rear edge in the axial direction of the body part 171, and a slide groove 178 continuous from the axial rear end of the guide groove 177. The slide groove 178 extends circumferentially toward the engaging direction of the second cam 130b, and is formed such as to allow circumferential movement of an inward protrusion 186 of the position-restricting cage ring 180 to be described later when the inner cage ring 170 is set to keep the second cams 130b in the engaged position.

Figure 9:
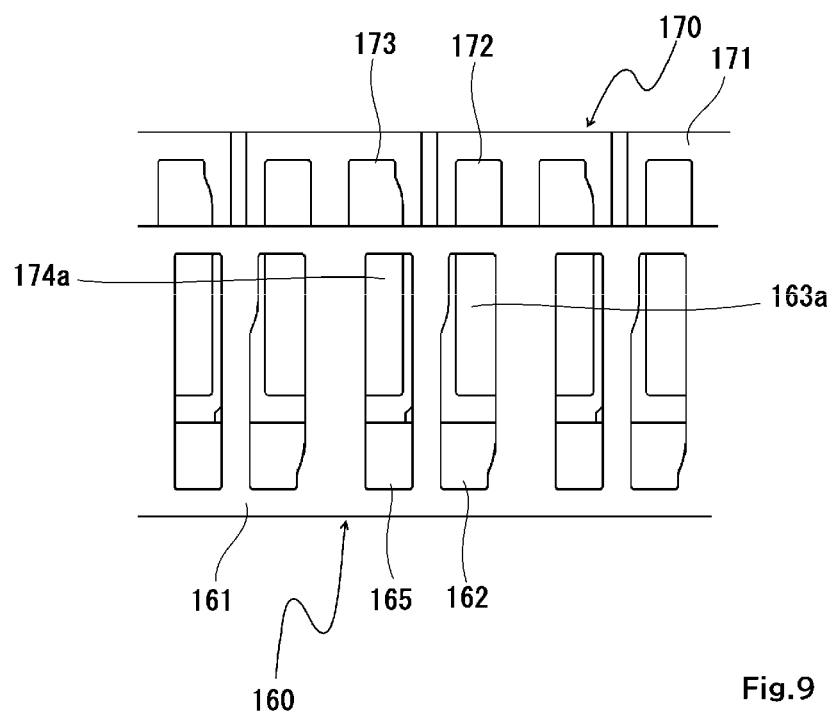
FIG. 9 is a developed view of part of the outer cage ring shown in FIG. 7A and the inner cage ring shown in FIG. 8A overlapped upon one another.

In the two-way lock mode of this cam clutch 100 according to the present invention in which relative rotation of the outer race 110 and inner race 120 is prohibited in both forward and reverse directions, as will be described in more detail later, the cam holding parts of the outer cage ring 160 and inner cage ring 170 are aligned as shown in FIG. 9 in a no-load condition where the cams are freed from the torque. Specifically, the guide space 163a of each first cam holding part 162 of the outer cage ring 160 radially overlaps each first cam holding part 172 of the inner cage ring 170, and each second cam holding part 165 of the outer cage ring 160 radially overlaps the guide space 174a of each second cam holding part 173 of the inner cage ring 170. The guide space 163a of each first cam holding part 162 of the outer cage ring 160, the second cam holding part 165 of the outer cage ring 160, the first cam holding part 172 of the inner cage ring 170, and the guide space 174a of each second cam holding part 173 of the inner cage ring 170 should preferably be each sized such as to keep both of the first cams 130a and second cams 130b lifted off at the same time, slightly spaced away from the raceway 121 of the inner race 120 so that the cams do not wedge against the inner race at all.

The cam clutch 100 of this embodiment is provided with the frictional resistance generating means 190 that generates friction resistance between the inner cage ring 170, which is a component adapted to tilt the first cams 130a or second cams 130b in the engaging direction, and the raceway 121 of the inner race 120 from which the first cams 130a and second cams 130b are being separated, when the first cams 130a and second cams 130b are both lifted off in a no-load condition in which torque is removed, for allowing reversal of the engaging direction in the two-way lock mode.

The frictional resistance generating means 190 generates friction resistance between the inner cage ring 170 and the raceway 121 of the inner race 120 in the state in which the respective cam holding parts of the outer cage ring 160 and inner cage ring 170 are aligned, to cause the inner cage ring 170 to move circumferentially relative to the outer cage ring 160. This intentional shift of the inner cage ring causes one of the first cams 130a and second cams 130b that are both lifted off to contact the raceway 121 of the inner race 120. This allows the inner cage ring 170 to tilt the first cams 130a or the second cams 130b that have been brought into contact with the raceway 121 of the inner race 120 in the engaging direction, and thus the engaging direction can be reversed.

Figure 10:
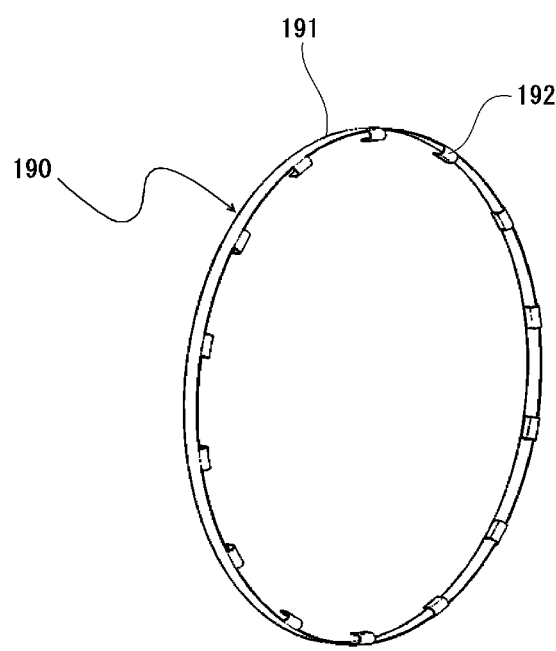
FIG. 10 is a perspective view illustrating the configuration of a frictional resistance generating means viewed from the front in the axial direction.
Figure 14A:
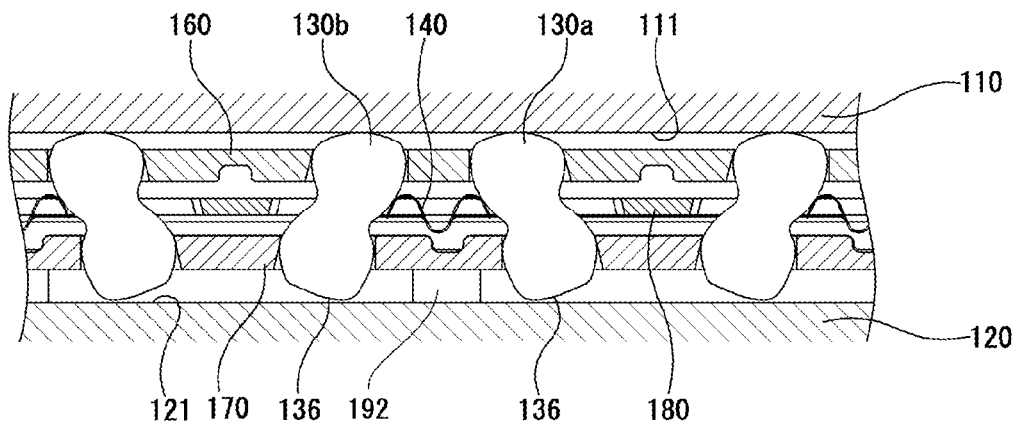
FIG. 14A is a schematic diagram for explaining a condition of both cams lifted off in the two-way lock mode.
Figure 14B:
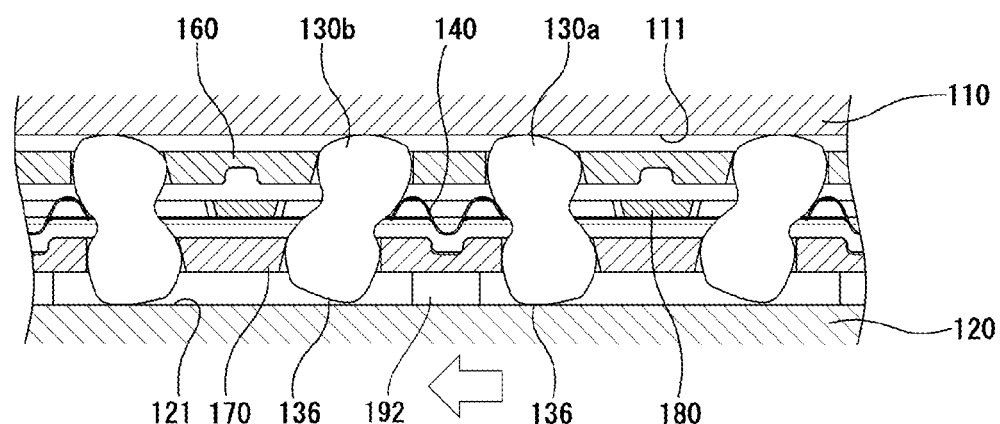
FIG. 14B is a schematic diagram for explaining a condition of the two-way lock mode prohibiting forward rotation.
Figure 14C:
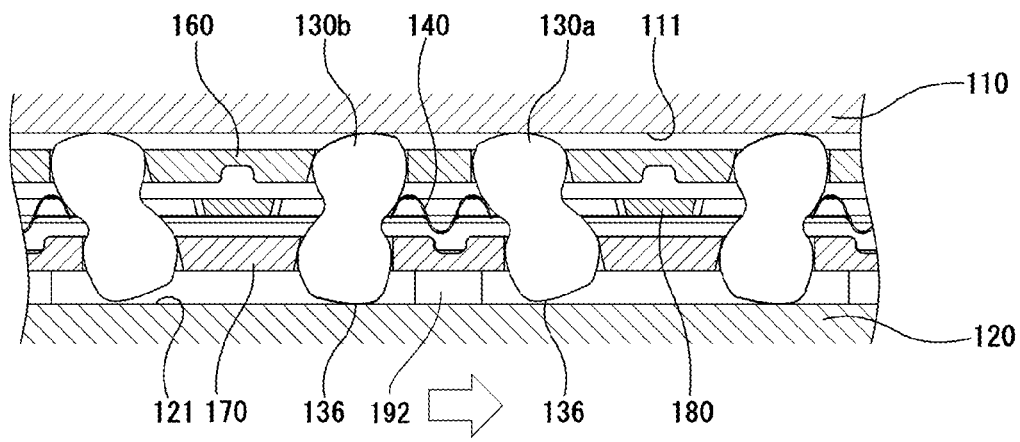
FIG. 14C is a schematic diagram for explaining a condition of the two-way lock mode prohibiting reverse rotation.

The frictional resistance generating means 190 is made up of a support ring 191 fixedly fitted inside the inner cage ring 170 and plate spring members 192 fixedly provided on the support ring 191 as shown in FIG. 10, for example. The plate spring members 192 are circumferentially equally spaced on the support ring 191, each positioned between a first cam 130a and a second cam 130b adjacent each other that are tilted toward each other in their respective disengaging directions, as shown in FIG. 14A, FIG. 14B, and FIG. 14C.

Figure 11:
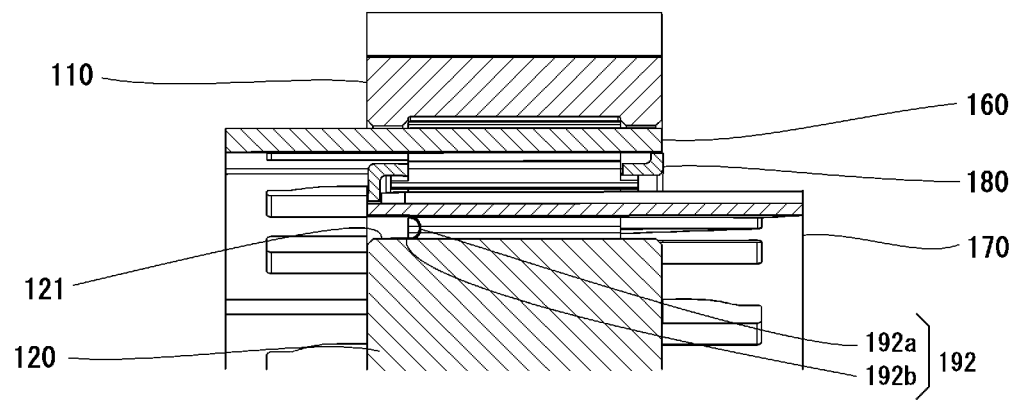
FIG. 11 is an axial cross-sectional view illustrating how plate spring members are disposed relative to other components.

The plate spring member 192 has a U-shaped cross-sectional shape, with two parallel flat plate portions 192*a* connected together via a semicylindrical top portion 192*b*, as shown in FIG. 11. The plate spring members are positioned on the inner circumferential surface of the inner cage ring 170, at one axial end thereof that faces the raceway 121 of the inner race 120 when both cams are lifted off, i.e., at a circumferential end on the rear side in the moving direction of the cage ring (left end in FIG. 11). The top portion 192*b* is oriented toward the other end of the inner cage ring 170, i.e., the front side in the moving direction of the cage ring (right side in FIG. 11) and the flat plate portions 192*a* are oriented toward the rear side in the moving direction of the cage ring. The moving direction of the cage ring here refers to the moving direction when the inner cage ring 170 is shifted from one operation mode in which the other axial end of the inner cage ring 170 faces the raceway 121 of the inner race 120 to another operation mode in which the one axial end of the inner cage ring 170 faces the raceway 121 of the inner race 120.

The operation mode switching mechanism 150 of the cam clutch 100 in this embodiment includes the position-restricting cage ring 180 as mentioned above, which restricts the degree of freedom of circumferential movement of the outer cage ring 160 and inner cage ring 170. Therefore, the degree of freedom of circumferential movement of the outer cage ring 160 and inner cage ring 170 relative to the position-restricting cage ring 180 can be adjusted suitably in accordance with each operation mode to keep the first cams 130*a* and second cams 130*b* in correct orientation.

Figure 12A:
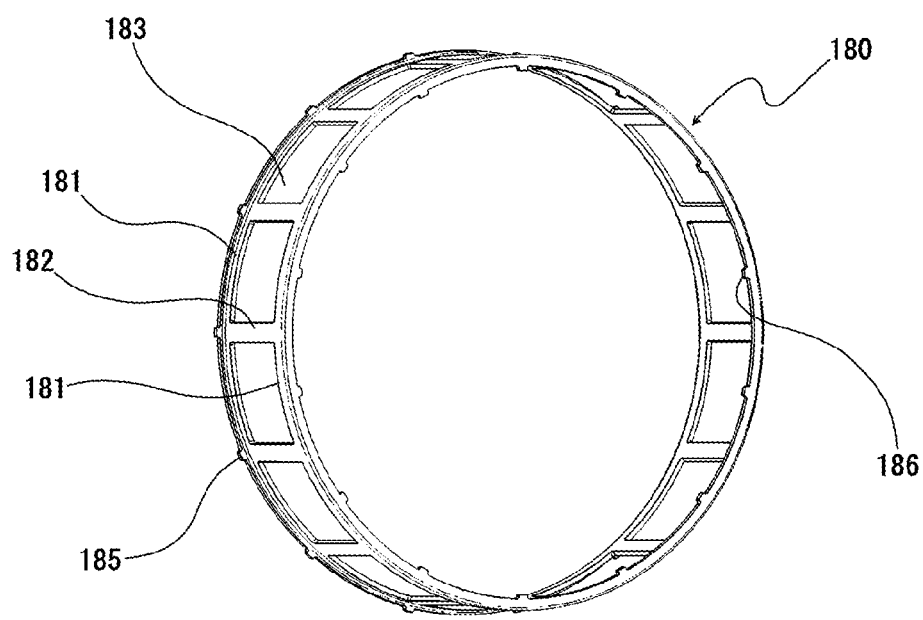
FIG. 12A is a perspective view illustrating the configuration of a position-restricting cage ring viewed from the rear in the axial direction.
Figure 12B:
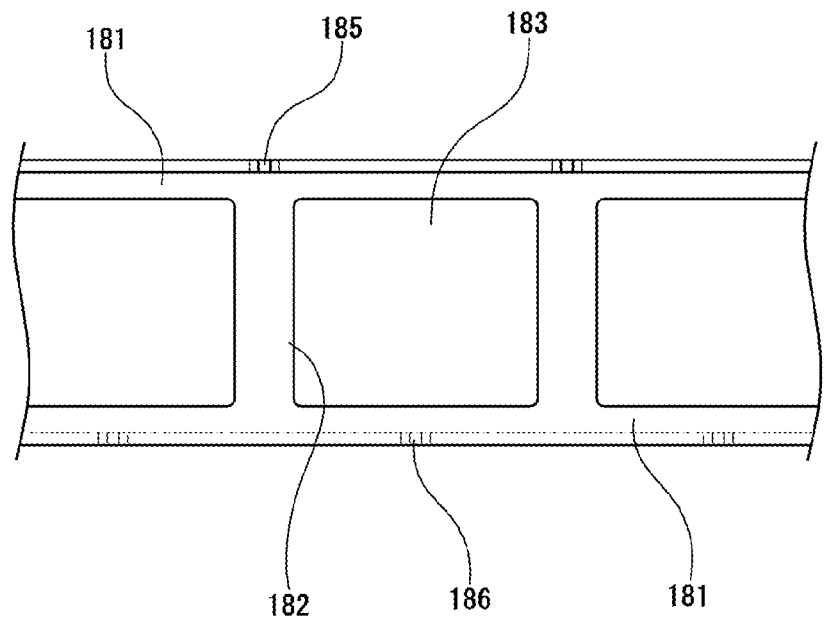
FIG. 12B is a developed view of part of the position-restricting cage ring shown in FIG. 12A.

The position-restricting cage ring 180 is made up of a pair of circumferentially extending annular parts 181 parallel to each other, and a plurality of connecting parts 182 connecting the annular parts 181 in the axial direction at a predetermined distance as shown in FIG. 12A and FIG. 12B. The space between adjacent connecting parts 182 each forms a pocket part 183 that can accommodate one each of the first cam 130*a* and second cam 130*b*. The pocket parts 183 are circumferentially equally spaced apart.

The position-restricting cage ring 180 includes outward protrusions 185 radially projecting outward from the axial front end and slidably engaged with the inner surface grooves 166 of the outer cage ring 160, and inward protrusions 186 radially projecting inward from the axial rear end and slidably engaged with the outer surface grooves 176 of the inner cage ring 170.

Hereinafter, the operation of the cam clutch 100 according to this embodiment will be described.

Figures 13A, 13B:
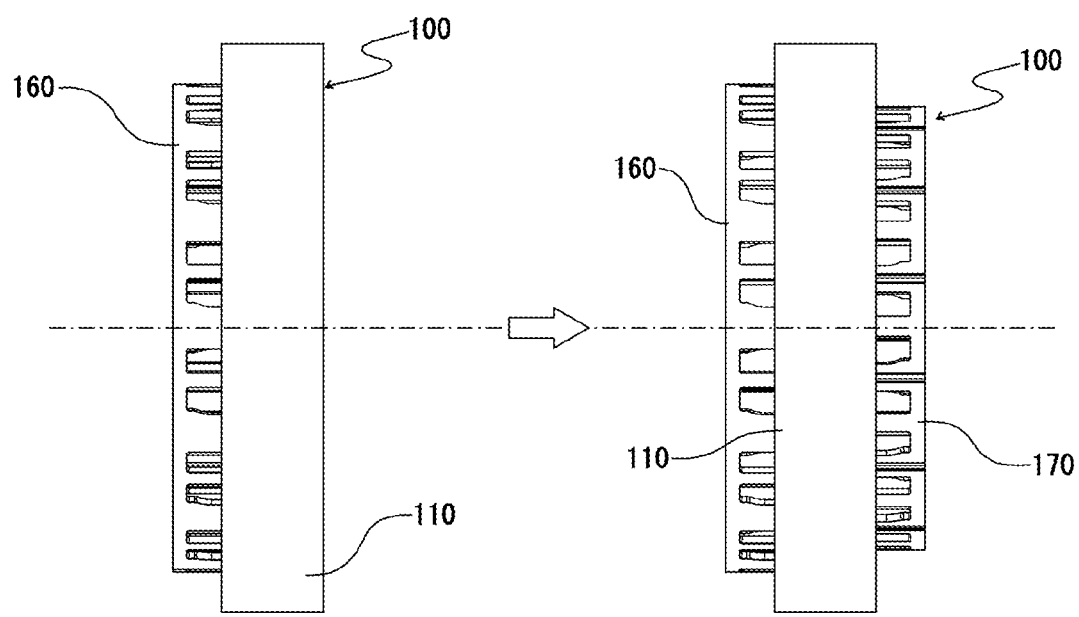
FIG. 13A and FIG. 13B are side views of the cam clutch shown in FIG. 1 illustrating the switching action from a forward lock mode to a two-way lock mode.

When the outer cage ring 160 and inner cage ring 170 are both positioned at the axial rear end as shown in FIG. 13A, the first cams 130*a* are kept in the standby state so that the first cams 130*a* can start wedging against the outer race 110 and inner race 120 immediately upon torque application to the outer race 110 or the inner race 120. Meanwhile, the inner-race engaging surface 136 of the second cams 130*b* is kept separated from the raceway 121 of the inner race 120. Namely, the cam clutch 100 is in the forward lock mode that prohibits relative rotation of the outer race 110 and inner race 120 in the forward direction.

With regard to the operation mode of the cam clutch 100, when the inner cage ring 170 is moved to the front in the axial direction (front side in the moving direction of the cage ring) as shown in FIG. 13B from the forward lock mode shown in FIG. 13A, the operation mode of the cam clutch 100 is switched from the forward lock mode to the two-way lock mode that prohibits relative rotation of the outer race 110 and inner race 120 in both forward and reverse directions.

In this switching from the forward lock mode to the two-way lock mode, as the inner cage ring 170 is moved axially frontward, the plate spring members 192 provided at one end on the rear side in the axial direction of the inner cage ring 170 start contacting the raceway 121, the top portions 192*b* first, as the plate spring members are moved toward the position radially opposite the raceway 121 of the inner race 120. In the two-way lock mode, the inner cage ring 170 is positioned at the front in the axial direction, so that the plate spring members 192 provided at one end on the rear side in the axial direction of the inner cage ring 170 are positioned radially (in the vertical direction in FIG. 13B) opposite one end on the rear side in the axial direction of the raceway 121 of the inner race 120, and thus friction resistance is generated between the plate spring members 192 and the raceway 121 of the inner race 120.

In the two-way lock mode, the first cams 130*a* and second cams 130*b* are essentially lifted off at the same time, each slightly separated from the raceway 121 of the inner race 120 in the no-load condition in which torque is removed. A torque applied to the outer race 110 or inner race 120 brings either the first cams 130*a* or the second cams 130*b* into contact with the raceway 121 of the inner race 120. Thus the first cams 130*a* or second cams 130*b* that have been brought into contact with the raceway 121 of the inner race 120 can be tilted in the engaging direction to shift to the state in which torque transmission is prohibited in the forward direction, or in the reverse direction.

More specifically, in the two-way lock mode, the first cams 130*a* and second cams 130*b* are bidirectionally shiftable between the state in which the first cams 130*a* and second cams 130*b* are both lifted off at the same time and slightly spaced from the raceway 121 of the inner race 120 as shown in FIG. 14A, and the forward lock state in which the first cams 130*a* stay engaged with the outer race 110 and inner race 120 while the second cams 130*b* are kept slightly separated from the raceway 121 of the inner race 120 to prohibit relative rotation in the forward direction as shown in FIG. 14B. Likewise, the first cams 130*a* and second cams 130*b* are bidirectionally shiftable between the lifted-off state and the reverse lock state in which the first cams 130*a* are kept slightly separated from the raceway 121 of the inner race 120 while the second cams 130*b* stay engaged with the outer race 110 and inner race 120 to prohibit relative rotation in the reverse direction as shown in FIG. 14C. Namely, in the two-way lock mode, the cams are bidirectionally shiftable between the forward lock state and the reverse lock state via the lifted-off state, i.e., reversal of the engaging direction is achieved via the lifted-off state.

In the lifted-off state, the head parts 132 of the first cams 130*a* are held in the first orientation-keeping spaces 163*b* of the first cam holding parts 162 of the outer cage ring 160, and the leg parts 135 of the first cams 130*a* are held by the first cam holding parts 172 of the inner cage ring 170, so that the first cams 130*a* are tilted toward the disengaging direction and kept slightly spaced away from the raceway 121 of the inner race 120. The head parts of the second cams 130*b* are held by the second cam holding parts 163 of the outer cage ring 160, and the leg parts of the second cams 130*b* are held in the second orientation-keeping spaces 174*c* of the second cam holding parts 173 of the inner cage ring 170, so that the second cams 130*b* are tilted toward the disengaging direction and kept slightly spaced away from the raceway 121 of the inner race 120.

In the shifting from the lifted-off state to the forward lock state, the head parts 132 of the first cams 130a are pushed by the action of the first opening-width transition part 164a of the first cam holding parts 162 of the outer cage ring 160, so that the first cams 130a are tilted in the engaging direction.

In the shifting from the lifted-off state to the reverse lock state, the leg parts 135 of the second cams 130b are pushed by the action of the second opening-width transition part 175b of the second cam holding parts 173 of the inner cage ring 170, so that the second cams 130b are tilted in the engaging direction.

For convenience of explanation, FIG. 14A, FIG. 14B, and FIG. 14C illustrate the raceway 111 of the outer race 110 and the raceway 121 of the inner race 120 as parallel flat surfaces. It should be noted that FIG. 14A, FIG. 14B, and FIG. 14C are schematic diagrams for explaining respective states of components and do not accurately reflect the actual dimensions of the components. For example, the tilt of the first cams 130a and second cams 130b, and how much the cams are spaced from the raceway 121 of the inner race 120, are illustrated in an exaggerated manner. In actuality the cams are separated only an extremely small distance (e.g., several tens to hundreds μm) from the raceway 121 of the inner race 120. Compared to the distance from the raceway 121 of the inner race 120 to the first cams 130a and second cams 130b in the two-way free mode to be described later, the cams are in more proximity to the raceway.

In the two-way lock mode, the outer cage ring 160 and inner cage ring 170 are not moved axially, so that the plate spring members 192 constantly generate friction resistance.

In the lifted-off state of the two-way lock mode, the cams are unloaded. The first cam holding parts 162 of the outer cage ring 160 and the first cam holding parts 172 of the inner cage ring 170 are aligned, and so are the second cam holding parts 163 of the outer cage ring 160 and the second cam holding parts 173 of the inner cage ring 170.

In the shifting from the forward lock state to the reverse lock state via the lifted-off state, for example, the torque load on the first cams 130a in the engaging direction gradually reduces, and the first cams 130a, when completely unloaded, tilt toward the disengaging direction so that the first cams 130a and second cams 130b are both lifted off. The torque successively acts reversely on the inner race 120 in the engaging direction, causing the inner cage ring 170 to rotate with the inner race 120 due to the friction resistance generated between the raceway 121 of the inner race 120 and the plate spring members 192 and to move circumferentially relative to the outer cage ring 160. This moves the cam holding parts of the outer cage ring 160 and inner cage ring 170 out of alignment, causing the second cams 130b that should engage next to tilt in the engaging direction and make contact with the raceway 121 of the inner race 120, i.e., come to the reverse lock state. Conversely, in the shifting from the reverse lock state to the forward lock state via the lifted-off state, the torque load on the second cams 130b in the engaging direction gradually reduces, and the second cams 130b, when completely unloaded, tilt toward the disengaging direction so that the first cams 130a and second cams 130b are both lifted off. The torque successively acts reversely on the inner race 120 in the engaging direction, causing the inner cage ring 170 to rotate with the inner race 120 due to the friction resistance generated between the raceway 121 of the inner race 120 and the plate spring members 192 and to move circumferentially relative to the outer cage ring 160. This moves the cam holding parts of the outer cage ring 160 and inner cage ring 170 out of alignment, causing the first cams 130a to tilt in the engaging direction and make contact with the raceway 121 of the inner race 120, i.e., come to the forward lock state.

In the unloaded lifted-off state, the frictional resistance generating means 190 plays a role in this manner in the control of the engaging directions of the first cams 130a or second cams 130b. The inner cage ring 170 rotating with the inner race 120 forces the cams to reverse the engaging direction and to shift from the forward lock state to the reverse lock state and vice versa. Thus the two-way lock mode is achieved without the possibility of unwanted jamming.

Conversely, to switch the operation mode of the cam clutch 100 from the two-way lock mode to the forward lock mode, the inner cage ring 170 is moved axially rearward. This movement causes the first opening-width transition part 175a of the second cam holding parts 173 of the inner cage ring 170 to push the leg parts 135 of the second cams 130b, so that the second cams 130b are tilted in the disengaging direction, and kept in the orientation in which the inner-race engaging surface 136 of the second cam 130b is separated from the raceway 121 of the inner race 120.

Meanwhile, the first cams 130a are kept in the standby state in which the first cams 130a can start engaging with the outer race 110 and inner race 120 immediately upon torque application to the outer race 110 or the inner race 120, as described above.

In this way, the operation mode of the cam clutch 100 is switched from the two-way lock mode to the forward lock mode.

Figures 15A, 15B:
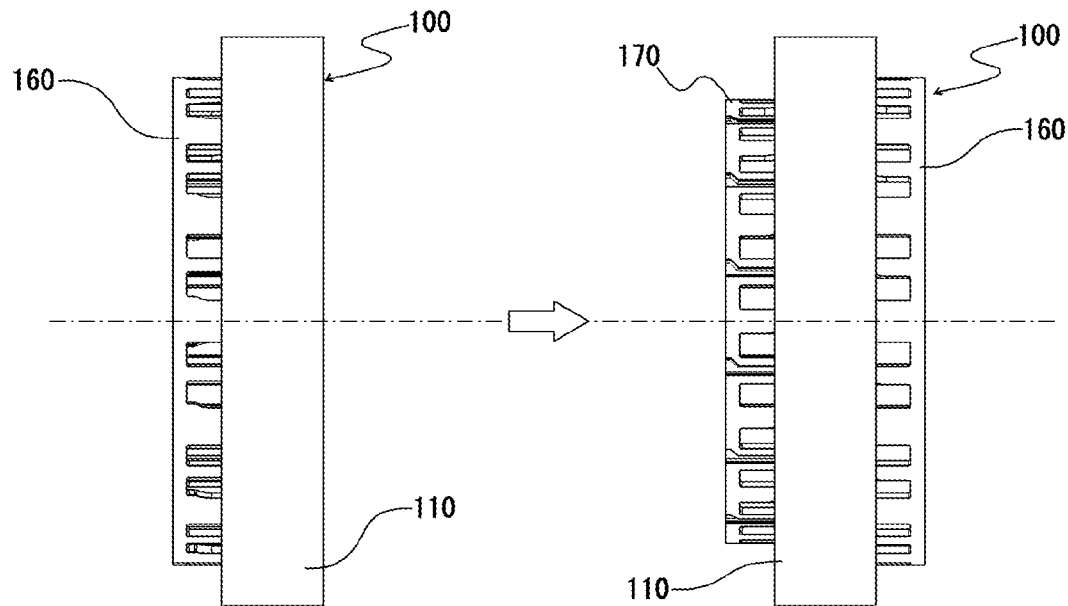
FIG. 15A and FIG. 15B are side views of the cam clutch shown in FIG. 1 illustrating the switching action from the forward lock mode to a two-way free mode.

With regard to the operation mode of the cam clutch 100, when the outer cage ring 160 is moved axially frontward as shown in FIG. 15B from the forward lock mode shown in FIG. 15A, the operation mode of the cam clutch 100 is switched from the forward lock mode to the two-way free mode that allows relative rotation of the outer race 110 and inner race 120 in both forward and reverse directions.

Specifically, an axial forward movement of the outer cage ring 160 causes the second opening-width transition part 164b of the first cam holding parts 162 of the outer cage ring 160 to push the head parts 132 of the first cams 130a. Thus the first cams 130a are tilted in the disengaging direction, and kept in the orientation in which the inner-race engaging surface 136 of the first cams 130a is separated from the raceway 121 of the inner race 120.

Meanwhile, the second cams 130b are kept in the orientation in which the inner-race engaging surface 136 of the second cams 130b is separated from the raceway 121 of the inner race 120. This is because the second cam holding parts 165 of the outer cage ring 160 have a constant opening width in the axial direction, and because the degree of freedom in circumferential direction of the outer cage ring 160 and inner cage ring 170 is limited by the position-restricting cage ring 180.

In both of the forward lock mode and the two-way free mode, the inner cage ring 170 is positioned on the rear side in the axial direction, so that the plate spring members 192 provided at one end on the rear side in the axial direction of the inner cage ring 170 are not radially facing the inner race 120. Accordingly no friction resistance is generated between the plate spring members 192 and the raceway 121 of the inner race 120.

Conversely, to switch the operation mode of the cam clutch 100 from the two-way free mode to the forward lock mode, the outer cage ring 160 is moved axially rearward. This movement causes the first opening-width transition part 164a of the first cam holding parts 162 of the outer cage ring 160 to push the head parts 132 of the first cams 130*a*, so that the first cams 130*a* are tilted in the engaging direction, and kept in the standby state in which the first cams 130*a* can start engaging with the outer race 110 and inner race 120 immediately upon torque application to the outer race 110 or the inner race 120. The outward protrusions 185 of the position-restricting cage ring 180 are allowed to move in the circumferential direction because of the slide grooves 168 of the inner surface grooves 166 of the outer cage ring 160. This suitably adjusts the degree of freedom of circumferential movement of the outer cage ring 160 relative to the position-restricting cage ring 180 to keep the first cams 130*a* in correct orientation.

Meanwhile, the second cams 130*b* are kept in the orientation in which the inner-race engaging surface 136 is separated from the raceway 121 of the inner race 120.

Figures 16A, 16B:
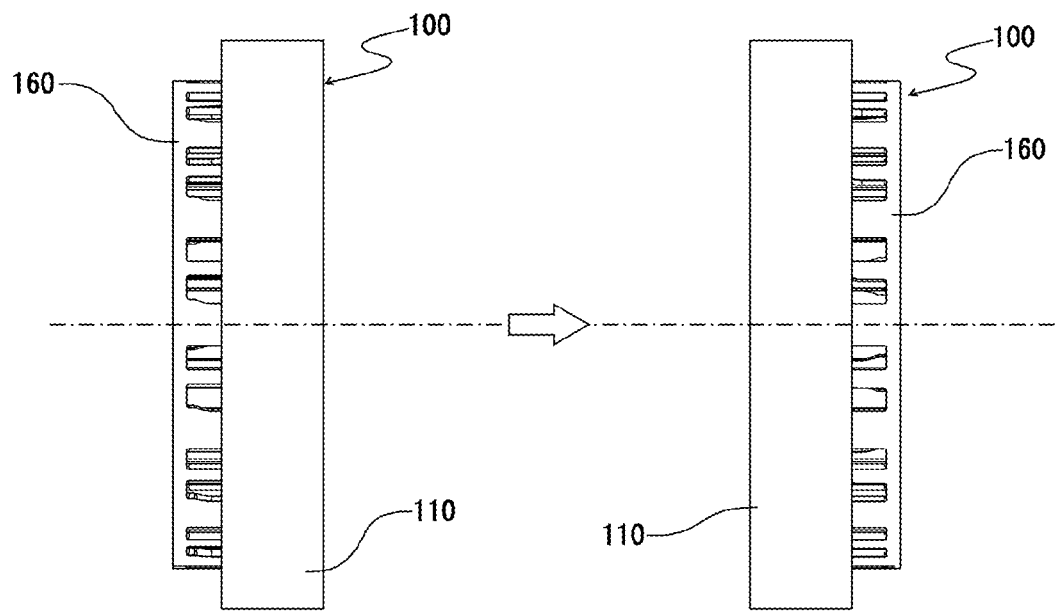
FIG. 16A and FIG. 16B are side views of the cam clutch shown in FIG. 1 illustrating the switching action from the forward lock mode to a reverse lock mode.

Further, with regard to the operation mode of the cam clutch 100, when the outer cage ring 160 and inner cage ring 170 are both moved axially frontward as shown in FIG. 16B from the forward lock mode shown in FIG. 16A, the operation mode of the cam clutch 100 is switched from the forward lock mode to the reverse lock mode that prohibits relative rotation of the outer race 110 and inner race 120 in the reverse direction.

Specifically, an axial forward movement of both the outer cage ring 160 and inner cage ring 170 causes the second opening-width transition part 164*b* of the first cam holding parts 162 of the outer cage ring 160 to push the head parts 132 of the first cams 130*a*. Thus the first cams 130*a* are tilted in the disengaging direction, and kept in the orientation in which the inner-race engaging surface 136 of the first cams 130*a* is separated from the raceway 121 of the inner race 120.

The leg parts 135 of the second cams 130*b* are pushed by the action of the second opening-width transition part 175*b* of the second cam holding parts 173 of the inner cage ring 170. Thus the second cams 130*b* are tilted in the engaging direction, and kept in the standby state in which the second cams 130*b* can start engaging with the outer race 110 and inner race 120 immediately upon torque application to the outer race 110 or the inner race 120. The inward protrusions 186 of the position-restricting cage ring 180 are allowed to move in the circumferential direction because of the slide grooves 178 of the outer surface grooves 176 of the inner cage ring 170. This suitably adjusts the degree of freedom of circumferential movement of the inner cage ring 170 relative to the position-restricting cage ring 180 to keep the second cams 130*b* in correct orientation.

Conversely, to switch the operation mode of the cam clutch 100 from the reverse lock mode to the forward lock mode, both the outer cage ring 160 and inner cage ring 170 are moved axially rearward. This movement causes the first opening-width transition part 164*a* of the first cam holding parts 162 of the outer cage ring 160 to push the head parts 132 of the first cams 130*a*, so that the first cams 130*a* are tilted in the engaging direction, and kept in the standby state in which the first cams 130*a* can start engaging with the outer race 110 and inner race 120 immediately upon torque application to the outer race 110 or the inner race 120. At this time, as described above, the degree of freedom of circumferential movement of the outer cage ring 160 relative to the position-restricting cage ring 180 is adjusted suitably and the first cams 130*a* are kept in correct orientation.

Meanwhile, the first opening-width transition part 175*a* of the second cam holding parts 173 of the inner cage ring 170 push the leg parts 135 of the second cams 130*b*, so that the second cams 130*b* are tilted in the disengaging direction, and kept in the orientation in which the inner-race engaging surface 136 of the second cam 130*b* is separated from the raceway 121 of the inner race 120.

In this way, the operation mode of the cam clutch 100 is switched from the reverse lock mode to the forward lock mode.

As described above, in the switching of operation modes by the operation mode switching mechanism of the cam clutch 100 according to this embodiment, the first cams 130*a* and second cams 130*b* undergo the lifted-off state in which both cams are separated at the same time from the raceway 121 of the inner race 120. Therefore, simultaneous wedging of the first cams 130*a* and second cams 130*b* against the inner race 120 and outer race 110 when unloaded can be essentially avoided. Moreover, the frictional resistance generating means 190 that generates friction resistance between the inner cage ring 170 and the inner race 120, from which the first cams 130*a* and second cams 130*b* are being separated, in the lifted-off state, enables torque transmission from the inner race 120 or outer race 110, even when both cams are lifted off, to either the first cams 130*a* or the second cams 130*b* whichever should engage next to cause the cams to tilt in the engaging direction. Accordingly, unwanted freewheeling or failure of torque transmission from the inner race 120 or outer race 110 to neither the first cams 130*a* nor the second cams 130*b* is prevented and the two-way lock mode is implemented. This means that, since the first cams 130*a* and second cams 130*b* do not remain engaged when the engaging direction is reversed, the thrust required for switching to another operation mode can be significantly reduced, which contributes to size reduction of the switching mechanism. Moreover, damage on the raceways of the inner and outer races can be minimized or eliminated even with more frequent switching of operation modes, so that the cam clutch can have a longer service life.

Embodiment 2

Figure 17:
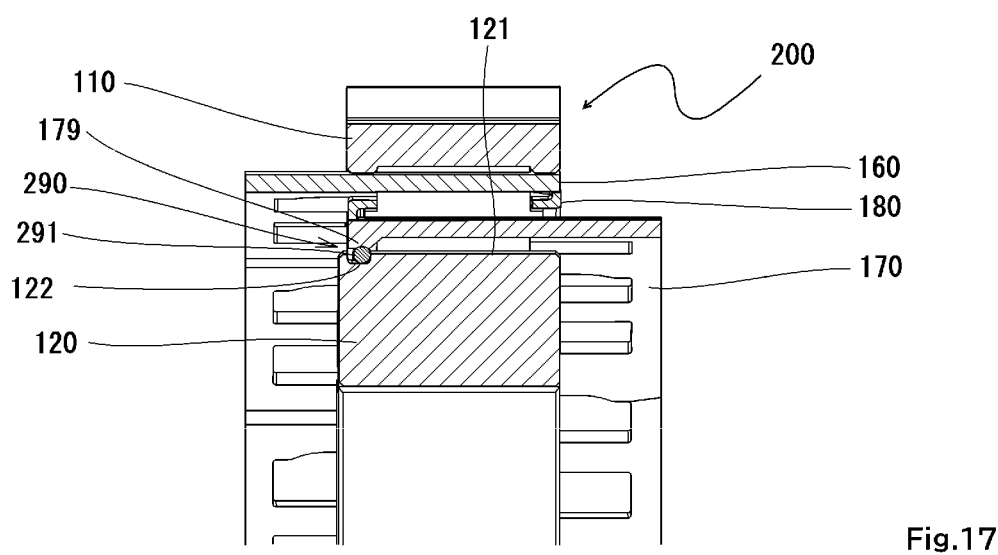
FIG. 17 is an axial cross-sectional view illustrating part of a cross section of the cam clutch according to a second embodiment of the present invention along a plane containing the rotation axis of the cam clutch.

The cam clutch 200 according to the second embodiment of the present invention is provided with a frictional resistance generating means 290 that uses an O-ring 291 as shown in FIG. 17 instead of the frictional resistance generating means 190. The inner cage ring 170 is formed with an annular protrusion 179 adapted to make contact with the O-ring 291. Other configurations are similar to the first embodiment described above. In FIG. 17 that illustrates the second embodiment, the same elements as those of the cam clutch 100 according to the first embodiment are given the same reference numerals.

The frictional resistance generating means 290 includes an O-ring 291 fixedly provided to the raceway 121 of the inner race 120 such as to generate friction resistance by making contact with an inner circumferential surface of the inner cage ring 170 when the first cams 130*a* and second cams 130*b* are separated from the inner race. The O-ring 291 extends all around the raceway 121 of the inner race 120, being fitted in an annular groove 122 that extends all around at one axial end (left end in FIG. 17) of the inner race facing the inner circumferential surface of the inner cage ring 170 when both cams are lifted off.

The annular protrusion 179 is provided on the inner circumferential surface of the inner cage ring 170, at one axial end that faces the O-ring 291 when both cams are lifted off, i.e., at a circumferential end on the rear side in the moving direction of the cage ring (left end in FIG. 17), such as to protrude toward the inner race 120.

When the inner cage ring 170 is moved axially frontward from the forward lock mode, the operation mode of the cam clutch 200 is switched to the two-way lock mode, wherein the annular protrusion 179 at one end on the rear side in the axial direction of the inner cage ring 170 comes to face the O-ring 291 fixed to the raceway 121 of the inner race 120 in the radial direction (vertical direction in FIG. 17) so that friction resistance is generated therebetween.

In the shifting from the forward lock state to the reverse lock state via the lifted-off state, the torque load on the first cams 130a in the engaging direction gradually reduces, and the first cams 130a, when completely unloaded, tilt toward the disengaging direction so that the first cams 130a and second cams 130b are both lifted off. The torque successively acts reversely on the inner race 120 in the engaging direction, causing the inner cage ring 170 to rotate with the inner race 120 due to the friction resistance generated between the O-ring 291 and the inner cage ring 170 and to move circumferentially relative to the outer cage ring 160. This moves the cam holding parts out of alignment, causing the second cams 130b that should engage next to tilt in the engaging direction and make contact with the raceway 121 of the inner race 120, i.e., come to the reverse lock state. Conversely, in the shifting from the reverse lock state to the forward lock state via the lifted-off state, the torque load on the second cams 130b in the engaging direction gradually reduces, and the second cams 130b, when completely unloaded, tilt toward the disengaging direction so that the first cams 130a and second cams 130b are both lifted off. The torque successively acts reversely on the inner race 120 in the engaging direction, causing the inner cage ring 170 to rotate with the inner race 120 due to the friction resistance generated between the O-ring 291 and the inner cage ring 170 and to move circumferentially relative to the outer cage ring 160. This moves the cam holding parts of the outer cage ring 160 and inner cage ring 170 out of alignment, causing the first cams 130a that should engage next to tilt in the engaging direction and make contact with the raceway 121 of the inner race 120, i.e., come to the forward lock state.

The cam clutch 200 according to this embodiment can provide similar effects as the cam clutch 100 of the above-described first embodiment.

While embodiments of the present invention have been described in detail, the present invention is not limited to the above-described embodiments and may be carried out with various design changes without departing from the scope of the present invention set forth in the claims.

For example, the frictional resistance generating means is not limited to the configurations of the embodiments described above and can be in any form as long as friction resistance is generated at least between the inner race, or the outer race, and a component adapted to control the tilting of the first cams or second cams in the state in which both first and second cams are lifted off, to bring either the first cams or the second cams into contact with the inner race or the outer race.

In the configurations described in the above embodiments, the cam clutch is in the forward lock mode when the outer cage ring and inner cage ring are positioned on the rear side in the axial direction. The relationship between the operation mode of the cam clutch and the axial position of the outer cage ring and inner cage ring is not limited to this particular example. For example, the cam clutch may be configured to switch to the two-way free mode, or two-way lock mode, or reverse lock mode, when the outer cage ring and inner cage ring are positioned on the rear side in the axial direction.

In each of the operation modes, one or both of the first cams and second cams may be configured to separate from the outer race instead of the inner race as described in the above embodiments.

What is claimed is:

1. A cam clutch comprising:
   an inner race and an outer race that are coaxial and rotatable relative to each other;
   a plurality of cams that are circumferentially arranged between the inner race and the outer race; and
   a biasing means for biasing each of the plurality of cams to make contact with the inner race and the outer race,
   the plurality of cams including first cams and second cams that wedge against the inner race and the outer race in different directions from each other,
   the cam clutch further comprising an operation mode switching mechanism that switches operation modes of the cam clutch,
   the operation modes selectable by the operation mode switching mechanism including a two-way lock mode that prohibits relative rotation of the inner race and the outer race in both of a forward direction and a reverse direction,
   the cam clutch including a frictional resistance generating means for generating friction resistance between a component adapted to tilt the first cams or the second cams in an engaging direction, and the inner race and/or the outer race from which the first cams and the second cams are being separated, when the first cams and the second cams are both lifted off and each slightly separated from a raceway of the inner race and/or a raceway of the outer race in the two-way lock mode,
   wherein the operation mode switching mechanism includes an outer cage ring configured to be axially movable independently of rotation of the outer race and the inner race and to change an orientation of the first cams, an inner cage ring configured to be axially movable independently of rotation of the outer race and the inner race and to change an orientation of the second cams, and a position-restricting cage ring provided between the outer cage ring and the inner cage ring and restricting a degree of freedom of circumferential movement of the outer cage ring and the inner cage ring,
   the component adapted to tilt the first cams or the second cams in the engaging direction being the outer cage ring and/or the inner cage ring,
   wherein the outer cage ring and the inner cage ring each include a first cam holding part and a second cam holding part that hold each of the first cams and the second cams, respectively,
   the second cam holding parts of the outer cage ring and the first cam holding parts of the inner cage ring being configured to have a constant opening width in an axial direction, and
   the first cam holding parts of the outer cage ring and the second holding parts of the inner cage ring being configured to have an opening-width transition part with an opening width continuously changing in the axial direction.

2. The cam clutch according to claim 1, wherein the frictional resistance generating means includes a plate spring member fixedly provided to an inner circumferential surface of the inner cage ring and/or an outer circumferential surface of the outer cage ring such as to generate friction resistance by making contact with the raceway of the inner race and/or the raceway of the outer race when the first cams and the second cams are separated from the raceways.

3. The cam clutch according to claim 2, wherein the plate spring member has a U-shaped cross-sectional shape,
and is positioned at one end which is on the inner circumferential surface of the inner cage ring and/or the outer circumferential surface of the outer cage ring and which is opposite the raceway of the inner race and/or the raceway of the outer race when the first cams and the second cams are both lifted off, with a top portion thereof being oriented toward an end opposite from the one end.

4. The cam clutch according to claim 1, wherein the frictional resistance generating means includes an O-ring fixedly provided to the raceway of the inner race and/or the raceway of the outer race so as to generate friction resistance by making contact with an inner circumferential surface of the inner cage ring and/or an outer circumferential surface of the outer cage ring when the first cams and the second cams are separated from the raceways.

5. The cam clutch according to claim 4, wherein the O-ring is positioned at one end which is on the raceway of the inner race and/or the raceway of the outer race and which is opposite the inner circumferential surface of the inner cage ring and/or the outer circumferential surface of the outer cage ring when the first cams and the second cams are both lifted off.

6. A cam clutch comprising:
an inner race and an outer race that are coaxial and rotatable relative to each other;
a plurality of cams that are circumferentially arranged between the inner race and the outer race; and
a biasing means for biasing each of the plurality of cams to make contact with the inner race and the outer race,
the plurality of cams including first cams and second cams that wedge against the inner race and the outer race in different directions from each other,
the cam clutch further comprising an operation mode switching mechanism that switches operation modes of the cam clutch,
the operation modes selectable by the operation mode switching mechanism including a two-way lock mode that prohibits relative rotation of the inner race and the outer race in both of a forward direction and a reverse direction,
the cam clutch including a frictional resistance generating means for generating friction resistance between a component adapted to tilt the first cams or the second cams in an engaging direction, and the inner race and/or the outer race from which the first cams and the second cams are being separated, when the first cams and the second cams are both lifted off and each slightly separated from a raceway of the inner race and/or a raceway of the outer race in the two-way lock mode,
wherein the operation mode switching mechanism includes an outer cage ring configured to be axially movable independently of rotation of the outer race and the inner race and to change an orientation of the first cams, an inner cage ring configured to be axially movable independently of rotation of the outer race and the inner race and to change an orientation of the second cams, and a position-restricting cage ring provided between the outer cage ring and the inner cage ring and restricting a degree of freedom of circumferential movement of the outer cage ring and the inner cage ring,
the component adapted to tilt the first cams or the second cams in the engaging direction being the outer cage ring and/or the inner cage ring,
wherein the frictional resistance generating means includes a plate spring member fixedly provided to an inner circumferential surface of the inner cage ring and/or an outer circumferential surface of the outer cage ring such as to generate friction resistance by making contact with the raceway of the inner race and/or the raceway of the outer race when the first cams and the second cams are separated from the raceways.

7. The cam clutch according to claim 6, wherein the plate spring member has a U-shaped cross-sectional shape,
and is positioned at one end which is on the inner circumferential surface of the inner cage ring and/or the outer circumferential surface of the outer cage ring and which is opposite the raceway of the inner race and/or the raceway of the outer race when the first cams and the second cams are both lifted off, with a top portion thereof being oriented toward an end opposite from the one end.

8. A cam clutch comprising:
an inner race and an outer race that are coaxial and rotatable relative to each other;
a plurality of cams that are circumferentially arranged between the inner race and the outer race; and
a biasing means for biasing each of the plurality of cams to make contact with the inner race and the outer race,
the plurality of cams including first cams and second cams that wedge against the inner race and the outer race in different directions from each other,
the cam clutch further comprising an operation mode switching mechanism that switches operation modes of the cam clutch,
the operation modes selectable by the operation mode switching mechanism including a two-way lock mode that prohibits relative rotation of the inner race and the outer race in both of a forward direction and a reverse direction,
the cam clutch including a frictional resistance generating means for generating friction resistance between a component adapted to tilt the first cams or the second cams in an engaging direction, and the inner race and/or the outer race from which the first cams and the second cams are being separated, when the first cams and the second cams are both lifted off and each slightly separated from a raceway of the inner race and/or a raceway of the outer race in the two-way lock mode,
wherein the operation mode switching mechanism includes an outer cage ring configured to be axially movable independently of rotation of the outer race and the inner race and to change an orientation of the first cams, an inner cage ring configured to be axially movable independently of rotation of the outer race and the inner race and to change an orientation of the second cams, and a position-restricting cage ring provided between the outer cage ring and the inner cage ring and restricting a degree of freedom of circumferential movement of the outer cage ring and the inner cage ring,
the component adapted to tilt the first cams or the second cams in the engaging direction being the outer cage ring and/or the inner cage ring,
wherein the frictional resistance generating means includes an O-ring fixedly provided to the raceway of the inner race and/or the raceway of the outer race so as to generate friction resistance by making contact with an inner circumferential surface of the inner cage ring and/or an outer circumferential surface of the outer cage ring when the first cams and the second cams are separated from the raceways.

9. The cam clutch according to claim 8, wherein the O-ring is positioned at one end which is on the raceway of the inner race and/or the raceway of the outer race and which is opposite the inner circumferential surface of the inner cage ring and/or the outer circumferential surface of the outer cage ring when the first cams and the second cams are both lifted off.

* * * * *